United States Patent
Kim et al.

(10) Patent No.: US 10,712,988 B2
(45) Date of Patent: *Jul. 14, 2020

(54) METHOD AND APPARATUS FOR CONTROLLING CONTROLLED DEVICE INCLUDED IN NETWORK

(71) Applicant: SAMSUNG ELECTRONICS CO., LTD., Suwon-si (KR)

(72) Inventors: Hark-joon Kim, Suwon-si (KR); Kuk-hyun Han, Suwon-si (KR); Sang-jun Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

This patent is subject to a terminal disclaimer.

(21) Appl. No.: 15/236,889

(22) Filed: Aug. 15, 2016

(65) Prior Publication Data
US 2016/0350047 A1 Dec. 1, 2016

Related U.S. Application Data

(63) Continuation of application No. 12/558,702, filed on Sep. 14, 2009, now Pat. No. 9,417,792.

(30) Foreign Application Priority Data

Mar. 18, 2009 (KR) .......................... 10-2009-0023072

(51) Int. Cl.
*G06F 3/14* (2006.01)
*H04L 12/28* (2006.01)
(Continued)

(52) U.S. Cl.
CPC .............. *G06F 3/14* (2013.01); *G06F 3/0482* (2013.01); *G06F 3/04886* (2013.01);
(Continued)

(58) Field of Classification Search
CPC .................................................... G06F 3/0481
(Continued)

(56) References Cited

U.S. PATENT DOCUMENTS 5,428,730 A    6/1995   Baker et al.
6,020,881 A    2/2000   Naughton et al.
(Continued)

FOREIGN PATENT DOCUMENTS

JP    2006-33645 A    2/2006
JP    2006-301998 A   11/2006
KR    2003-0013732 A   2/2003

OTHER PUBLICATIONS

Communication dated May 15, 2015 issued by the Korean Intellectual Property Office in counterpart Korean Patent Application No. 10-2009-0023072.

*Primary Examiner* — Matthew Ell
(74) *Attorney, Agent, or Firm* — Sughrue Mion, PLLC

(57) ABSTRACT

A method of controlling at least one controlled device at an external device outside a network including a control device and the controlled device is provided. The method includes transmitting a message accepting a control request requesting to control the controlled device in a session established with the control device; receiving and displaying an identifier for identifying the controlled device; and selectively controlling the controlled device via the control device based on an input generated using the displayed identifier.

15 Claims, 8 Drawing Sheets

(51) Int. Cl.
*G06F 3/0488* (2013.01)
*G06F 3/0482* (2013.01)
*H04M 1/725* (2006.01)
*G06F 3/0484* (2013.01)

(52) U.S. Cl.
CPC ...... *H04L 12/2809* (2013.01); *H04L 12/2818* (2013.01); *H04M 1/72533* (2013.01); *G06F 3/04842* (2013.01)

(58) Field of Classification Search
USPC ........................................................ 715/740
See application file for complete search history.

(56) References Cited

U.S. PATENT DOCUMENTS

| | | | |
|---|---|---|---|
| 7,010,294 B1 | 3/2006 | Pyotsia et al. | |
| 7,346,847 B2* | 3/2008 | Etter | B23B 25/06 33/286 |
| 7,558,950 B2 | 7/2009 | Ljung et al. | |
| 2002/0073183 A1 | 6/2002 | Yoon et al. | |
| 2008/0198138 A1* | 8/2008 | McFarlane | G06F 3/0421 345/173 |
| 2008/0259043 A1* | 10/2008 | Buil | H04B 13/005 345/173 |
| 2009/0284476 A1* | 11/2009 | Bull | G06F 9/452 345/173 |

\* cited by examiner

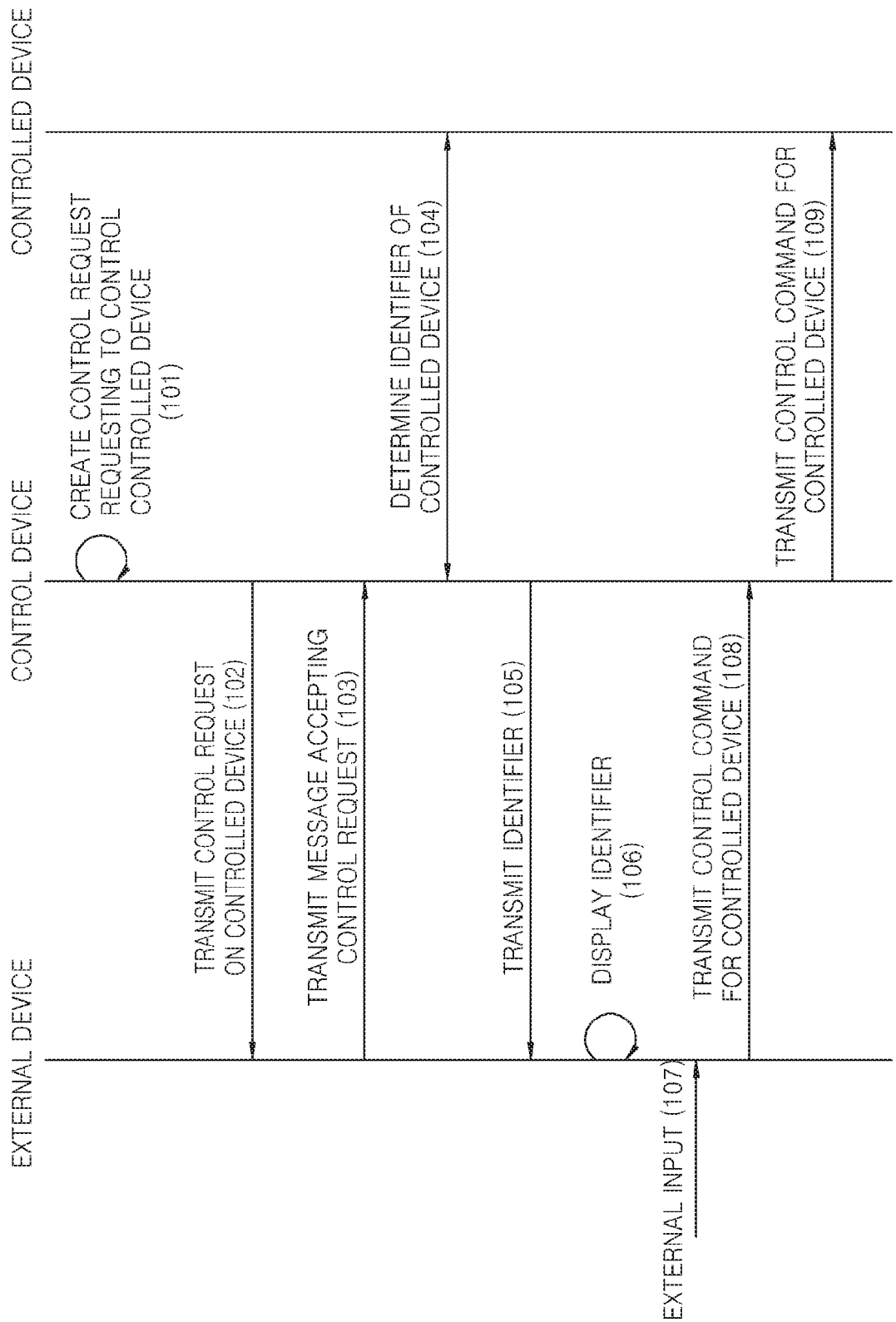

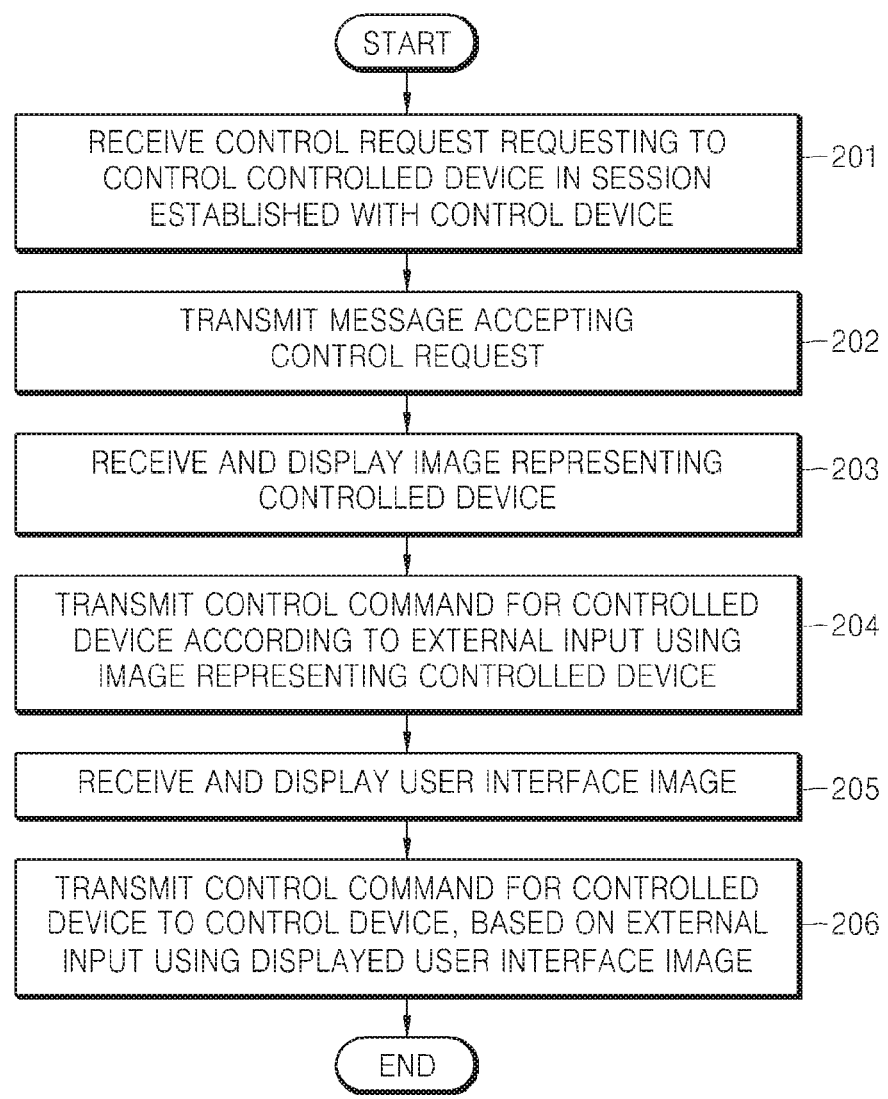

METHOD AND APPARATUS FOR CONTROLLING CONTROLLED DEVICE INCLUDED IN NETWORK

CROSS-REFERENCE TO RELATED PATENT APPLICATION

This application is a Continuation application of U.S. application Ser. No. 12/558,702, which claims priority from Korean Patent Application No. 10-2009-0023072, filed on Mar. 18, 2009, in the Korean Intellectual Property Office, the disclosures of which are incorporated herein by reference in their entireties.

BACKGROUND OF THE INVENTION

1. Field of the Invention

Methods and apparatuses consistent with the present invention relate to controlling at least one controlled device from outside a network including a control device and the controlled device.

2. Description of the Related Art

Currently, due to the rapid development of information technology (IT) and the popularization of the Internet in high-speed networks, network environments, which have been mainly used in enterprises, public organizations, etc., are also being applied to digital home electronic devices. As a result, interest in the home network industry and its related device market is increasing.

A home network is a set of components that are set at home to process, manage, transfer, and store information and that connect and integrate devices for performing various functions such as calculations, management, monitoring, and communication. The home network consists of a combination of two or more devices for communicating and sharing data with each other. In the home network, a network is used, digital data is shared, and broadband communication is performed between information devices at home. The home network is formed according to various network protocols such as an Ethernet protocol, a telephone line protocol, a power line protocol, and a wireless protocol, and allows network information devices (e.g., a personal computer (PC), a mobile phone, a digital television (TV), a personal digital assistant (PDA), a game player, etc.) to share functions and data with each other and to be controlled from a remote place. Also, the home network allocates applications and services to an Internet access device, an audio/video streaming device, a home control application and service device, and other network devices. In order to control network digital information devices at home, a method of remotely controlling network digital information devices at home by using a terminal such as a PC or a mobile phone has been developed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for remotely sharing a communication device between users, and more particularly, a method and apparatus for controlling at least one controlled device from outside a network including a control device and the controlled device.

According to an aspect of the present invention, there is provided a method of controlling at least one controlled device at an external device outside a network including a control device and the controlled device, the method including transmitting a message accepting a control request requesting to control the controlled device in a session established with the control device; receiving and displaying an identifier for identifying the controlled device; and selectively controlling the controlled device via the control device based on an input using the displayed identifier.

The identifier may be an image representing the controlled device.

The selectively controlling of the controlled device may include receiving a user interface image of the controlled device; displaying the user interface image according to an external input using the image representing the controlled device; and transmitting a control command to control the controlled device to the control device based on an external input using the displayed user interface image.

The selectively controlling of the controlled device may include receiving from the control device a control command menu for the controlled device to perform a predetermined function; displaying the control command menu according to an external input using the image representing the controlled device; and transmitting a control command to control the controlled device to the control device based on an external input using the displayed control command menu.

The receiving and displaying of the identifier may include receiving and displaying the identifier from an external server connected to the control device.

According to another aspect of the present invention, there is provided a method of controlling at least one controlled device in a network including the controlled device, the method including transmitting a control request requesting to control the controlled device to an external device with which a session is established; receiving from the external device a message accepting the control request; determining an identifier for identifying the controlled device; transmitting the determined identifier to the external device; and receiving from the external device a control command to control the controlled device, which uses the identifier of the controlled device.

The method may further include transmitting a user interface image regarding the determined controlled device to the external device, and the receiving of the control command may include receiving the control command to control the controlled device, which uses the user interface image.

The method may further include transmitting a control command-based menu regarding the determined controlled device to the external device, and the receiving of the control command may include receiving the control command to control the controlled device, which uses the control command-based menu.

The determining of the identifier may include selecting the controlled device by using a tag reader for reading the tag if the controlled device includes a tag having identification (ID) information of the controlled device; and determining the identifier for the selected controlled device.

The determining of the identifier may include transmitting to the controlled device a signal induced by a user touching a surface of a touch screen; receiving information regarding the signal and an ID of the controlled device, which are detected by the controlled device, through a communication channel; selecting the controlled device based on the received information regarding the signal and the ID of the controlled device; and determining the identifier for the selected controlled device.

The transmitting of the determined identifier may include transmitting the determined identifier of the controlled device to a server for transmitting an image to the external device.

According to another aspect of the present invention, there is provided an apparatus for controlling at least one controlled device from outside a network including a control device and the controlled device, the apparatus including a transmission unit for transmitting a message accepting a control request requesting to control the controlled device in a session established with the control device; a reception unit for receiving an identifier for identifying the controlled device; a display unit for displaying the received identifier; and a control unit for selectively controlling the controlled device via the control device based on an external input using the displayed identifier.

According to another aspect of the present invention, there is provided an apparatus for controlling at least one controlled device in a network including the controlled device, the apparatus including a first transmission unit for transmitting a control request requesting to control the controlled device to an external device with which a session is established; a first reception unit for receiving from the external device a message of accepting the control request; a control unit for determining an identifier for identifying the controlled device; a second transmission unit for transmitting the determined identifier to the external device; and a second reception unit for receiving from the external device a control command to control the controlled device, which uses the identifier of the controlled device.

BRIEF DESCRIPTION OF THE DRAWINGS

The above and other aspects of the present invention will become more apparent by describing in detail exemplary embodiments thereof with reference to the attached drawings in which:

FIG. 1 is a flowchart of a method of controlling at least one controlled device from outside a network including a control device and the controlled device, according to an exemplary embodiment of the present invention;

FIG. 2 is a detailed flowchart of a method of controlling at least one controlled device from outside a network including a control device and the controlled device, according to an exemplary embodiment of the present invention;

DETAILED DESCRIPTION OF EXEMPLARY EMBODIMENTS

Figure 3A:
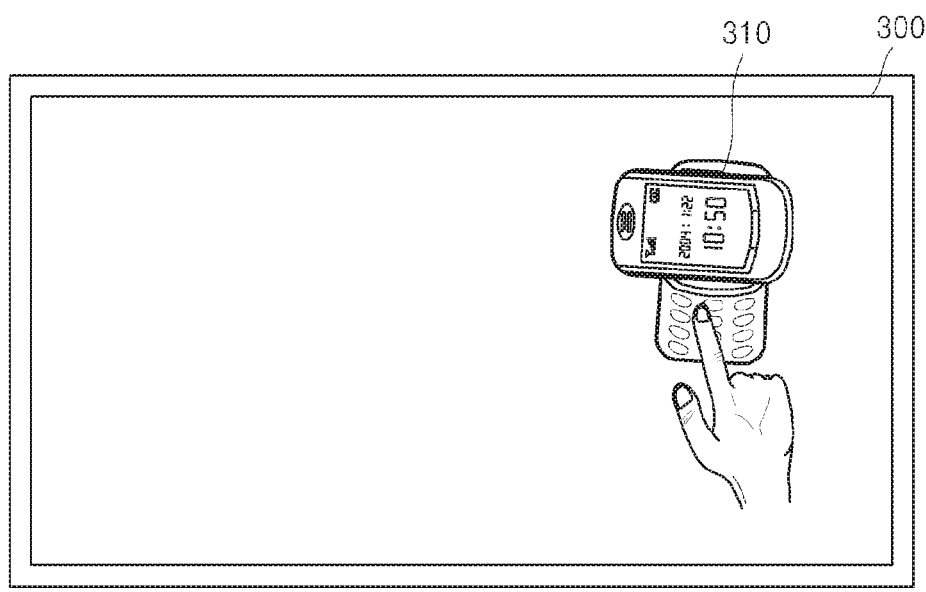
FIG. 3A is a diagram showing an image of a controlled device displayed on an external device, according to an exemplary embodiment of the present invention.

Hereinafter, the present invention will be described in detail by explaining exemplary embodiments of the invention with reference to the attached drawings.

FIG. 1 is a flowchart of a method of controlling at least one controlled device from outside a network including a control device and the controlled device, according to an exemplary embodiment of the present invention.

The control device and the controlled device are connected to each other in the network. For example, in a home network, controlled devices may be various information home appliances, a control device may be a device for controlling the information home appliances, and the control device and the information home appliances may be connected to each other in a wire or wireless network. In the exemplary embodiments of the present invention, a control device is a device that may communicate with an external device at a remote location and may control a controlled device in a network.

Referring to FIG. 1, in operation 101, the control device creates a control request in order to authorize an external device to control the controlled device.

In operation 102, the control device transmits the control request requesting to control the controlled device to the external device with which a session is established.

In operation 103, the external device receives the control request and transmits a message accepting the control request to the control device. Then, the external device is authorized to control the controlled device.

In operation 104, the control device determines an identifier of the controlled device connected in the network. The control device selects at least one shared controlled device so as to be controllable by the external device, and determines an identifier of the selected controlled device. The control device may prestore the identifier of the controlled device. Also, the control device may receive the identifier from the selected controlled device. The identifier may be an image representing the selected controlled device.

In operation 105, the control device transmits the determined identifier of the controlled device to the external device.

In operation 106, the external device displays the identifier on a display unit of the external device.

In operations 107 through 109, if a user input regarding the displayed identifier is received, the external device transmits a control command to control the controlled device to the control device, and the control device transmits the control command to the controlled device. According to another exemplary embodiment of the present invention, if a user input regarding the displayed identifier is received, the external device may transmit a control command to control the controlled device directly to the controlled device.

Accordingly, a user does not need to directly access a desired device or to access a hub in a house to search for a device when the user is at a remote location. Also, although a high security level of user authentication is mostly required to control a controlled device from a remote location, according to the current exemplary embodiment, the external device and the user of the control device are in mutual communication and thus user authentication is not required.

FIG. 2 is a detailed flowchart of a method of controlling at least one controlled device from outside a network including a control device and the controlled device, according to an exemplary embodiment of the present invention.

Descriptions of the external device, the control device, and the controlled device have been provided above with reference to FIG. 1 and thus will not be repeated here.

Referring to FIG. 2, in operation 201, the external device receives from the control device a control request requesting to control the controlled device in a session established with the control device. Then, in operation 202, the external device transmits a message accepting the control request to the control device.

In operation 203, the external device receives an image representing the controlled device from the control device and displays the image on a display unit of the external device. The image representing the controlled device may be a model image of the controlled device. However, the image is not limited to the model image and may be anything representing the controlled device. Also, the external device may receive the image representing the controlled device, of which predetermined portions are mapped to commands for controlling the controlled device. Also, the external device may receive commands for controlling the controlled device and then may map the control commands to predetermined portions of the image representing the controlled device. According to another exemplary embodiment of the present invention, the external device may receive the image representing the controlled device from an external server connected to the control device.

In operation 204, the external device transmits a control command to control the controlled device to the control device according to an external input using the image representing the controlled device. In more detail, if a user input regarding the controlled device is generated using the displayed image representing the controlled device, the external device transmits a predetermined control command to control the controlled device to the control device. According to another exemplary embodiment of the present invention, the external device may transmit the control command to control the controlled device directly to the controlled device.

Operations 203 and 204 will now be described in detail with reference to FIG. 3A.

FIG. 3A is a diagram showing an image 310 of a controlled device displayed on an external device, according to an exemplary embodiment of the present invention.

Referring to FIG. 3A, the controlled device shared by a control device is a mobile phone. Thus, the image 310 representing the mobile phone is displayed on a display unit 300 of the external device. In order to control the mobile phone as if the mobile phone is directly controlled, the external device receives commands for controlling the mobile phone and then maps the commands to portions of the image 310, which separately correspond to actual portions of the mobile phone. In more detail, the external device maps the commands to actual portions of the mobile phone, such as an interface screen, a cursor, direction keys, number keys, etc. If a certain direction key is pressed on the image 310 of the mobile phone, which is displayed on the display unit 300 of the external device, the mobile phone may be controlled as if an actual certain direction key of the mobile phone is pressed.

Referring to FIG. 2, in operation 205, the external device receives a user interface image and displays the user interface image on the display unit of the external device. The external device receives a current user interface image of the controlled device shared by the control device. Also, the external device may receive a user interface image to which commands for controlling the controlled device are mapped. Also, the external device may receive commands for controlling the controlled device and then may map the control commands to predetermined portions of the user interface image. Accordingly, the external device may control the controlled device by using a user interface that is the same as an actual user interface of the controlled device.

In operation 206, the external device transmits a control command to control the controlled device to the control device, based on an external input using the displayed user interface image. According to another exemplary embodiment of the present invention, the external device may transmit the control command to control the controlled device directly to the controlled device.

Operations 205 and 206 will now be described in detail with reference to FIG. 3B.

Figure 3B:
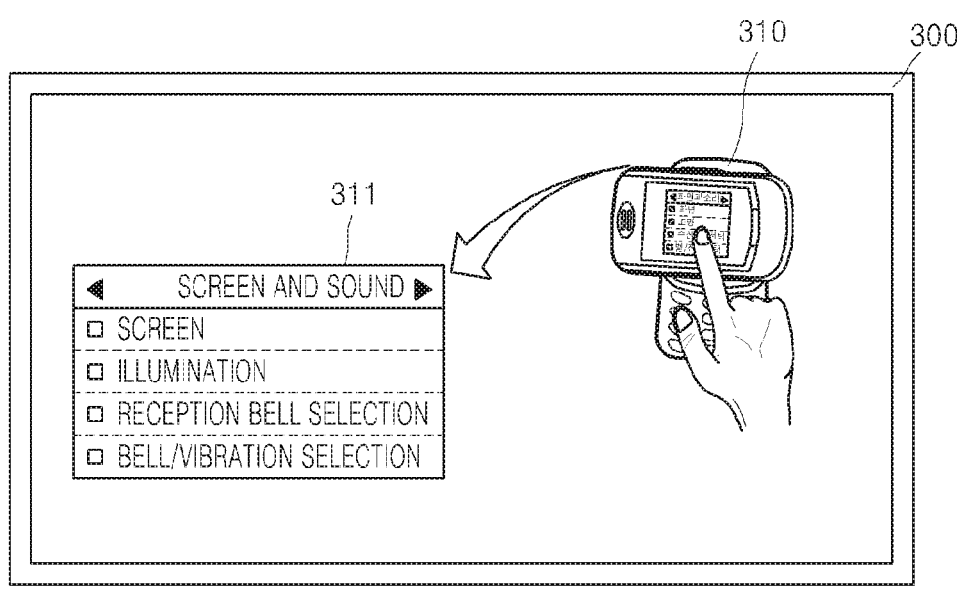
FIG. 3B is a diagram showing a user interface image of a controlled device displayed on an external device, according to an exemplary embodiment of the present invention.

FIG. 3B is a diagram showing a user interface image 311 of a controlled device displayed on an external device, according to an exemplary embodiment of the present invention.

Referring to FIG. 3B, the controlled device shared by a control device is a mobile phone and an image 310 representing the mobile phone is displayed on a display unit 300 of the external device. When the external device transmits a control command to control the controlled device to the control device by using the image 310 representing the controlled device and then the controlled device executes the control command, a current interface screen of the mobile phone may be changed. In this case, the changed current interface screen is transmitted to and displayed on the external device. The user interface image 311 is the same as an actual user interface of the mobile phone, i.e., the controlled device. Also, in order to control the mobile phone as if the mobile phone is directly controlled, the external device may receive commands for controlling the mobile phone according to a current user interface and then may map the commands to portions of the user interface image 311, which separately correspond to actual portions of the mobile phone.

Figure 3C:
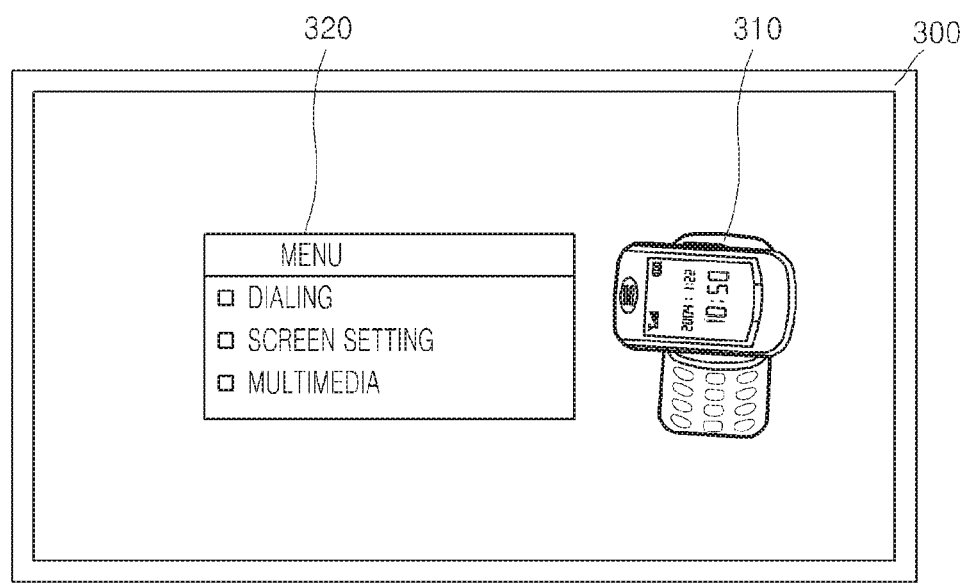
FIG. 3C is a diagram showing a control command menu regarding a controlled device displayed on an external device, according to an exemplary embodiment of the present invention.

According to another exemplary embodiment of the present invention, in operations 205 and 206, the external device receives a control command menu for the controlled device to perform a predetermined function. In this case, the control command menu is displayed on the display unit 300 of the external device. Then, if a user input regarding the control command menu is made, the external device transmits a control command corresponding to the user input to the control device. FIG. 3C is a diagram showing a control command menu regarding a controlled device displayed on an external device, according to an exemplary embodiment of the present invention.

Figure 4:
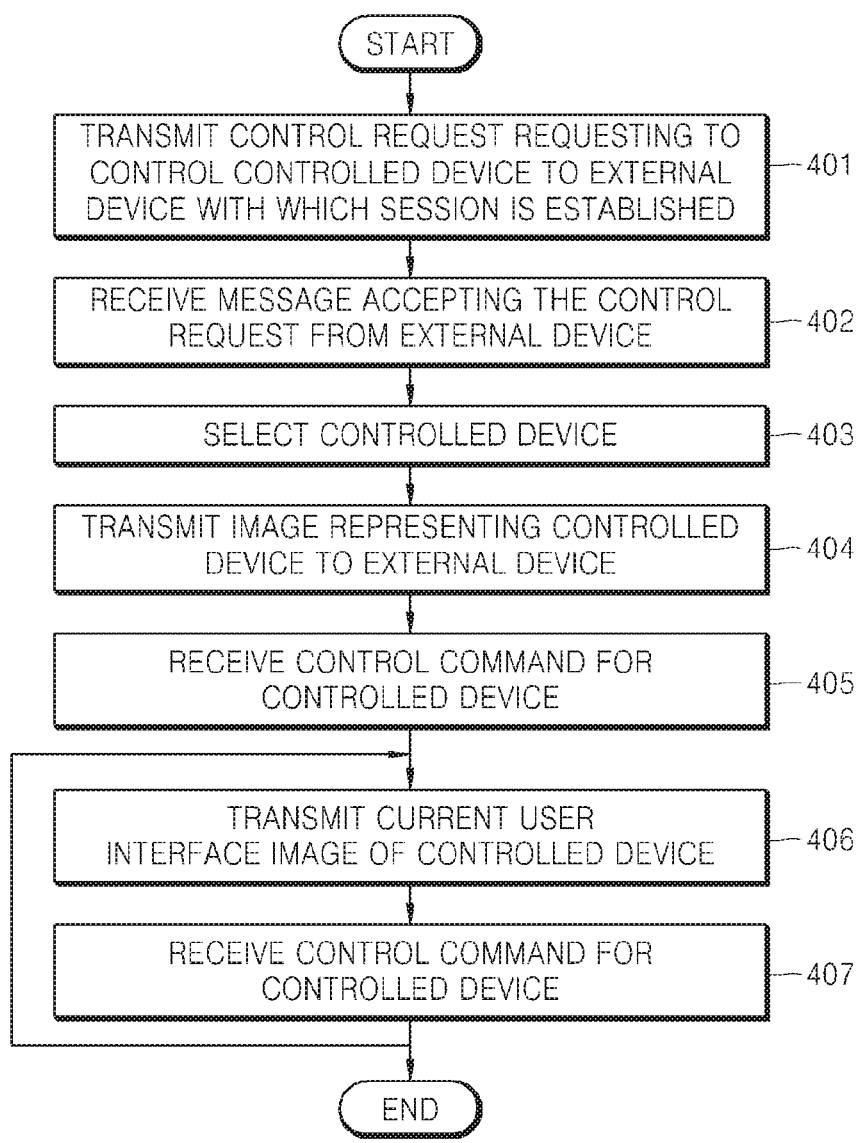
FIG. 4 is a detailed flowchart of a method of controlling at least one controlled device in a network including the controlled device, according to an exemplary embodiment of the present invention.

FIG. 4 is a detailed flowchart of a method of controlling at least one controlled device in a network including the controlled device, according to an exemplary embodiment of the present invention.

Descriptions of an external device, a control device, and the controlled device have been provided above with reference to FIG. 1 and thus will be omitted here.

Referring to FIG. 4, in operation 401, the control device creates a control request in order to authorize the external device to control the controlled device. Then, the control device transmits the control request for controlling the controlled device to the external device with which a session is established. Then, in operation 402, the control device receives from the external device a message accepting the control request.

In operation 403, the control device searches for and selects the controlled device shared by the control device.

Figure 5A:
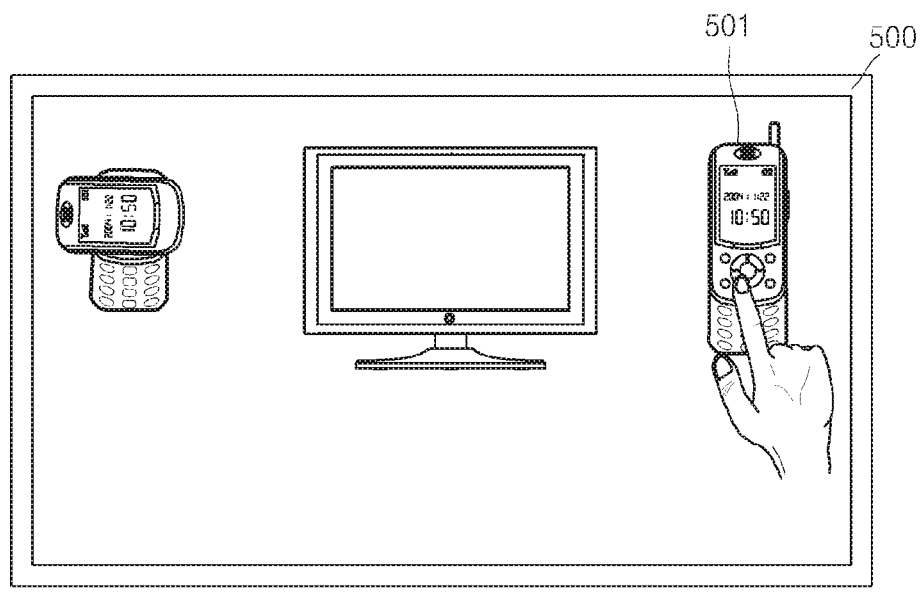
FIGS. 5A through 5C are images for describing a method of selecting a controlled device, according to an exemplary embodiment of the present invention.
Figure 5B:
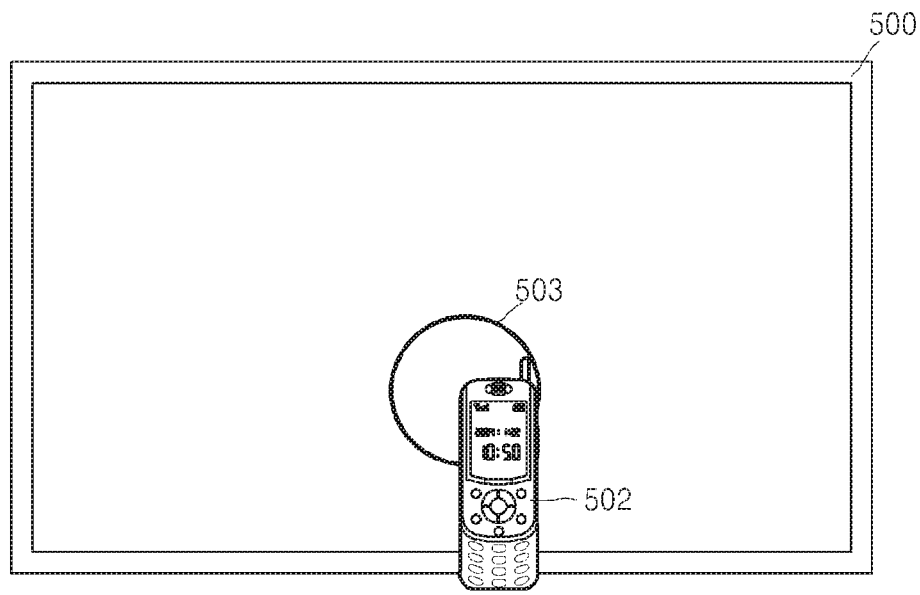
Figure 5C:
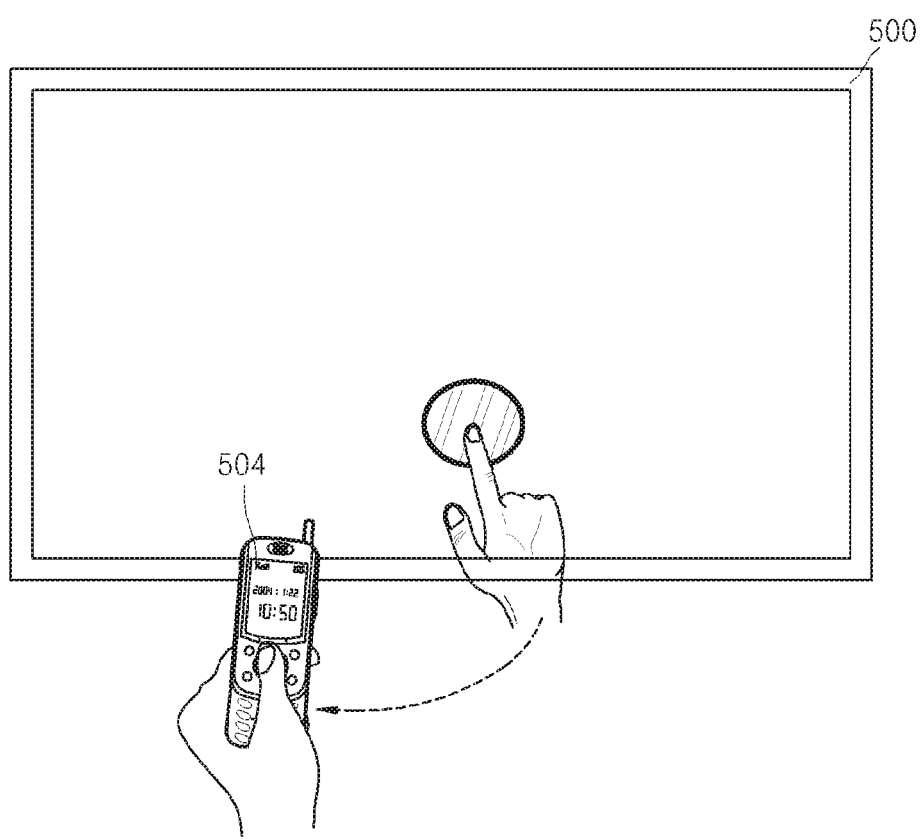

FIGS. 5A through 5C are images for describing a method of selecting a controlled device, according to an exemplary embodiment of the present invention.

Referring to FIG. 5A, a list of identifiers of controlled devices shared in a network is/are displayed on a display unit 500 of a control device. A user of the control device may select the controlled device 501 to be shared with an external device. Referring to FIG. 5B, it is assumed that the controlled device 502 includes a tag (e.g., a radio frequency identification (RFID) tag) having information regarding the controlled device 502 and that the control device includes a tag reader 503 for reading the tag. In this case, if the controlled device 502 is placed in close proximity to the display unit 500 of the control device so that the tag reader 503 may read the tag, the controlled device 502 is selected. Referring to FIG. 5C, the controlled device 504 and the display unit 500 of the control device are connected to each other through a communication channel. The display unit 500 of the control device may be a touch screen. It is assumed that the user holds the controlled device 504 with one hand and touches the surface of the touch screen 500 with the other hand. In this case, a signal induced in the surface of the touch screen 500 by the user touching the surface of the touch screen 500 is transmitted to the controlled device 504. The controlled device 504 detects a scan frequency component from the signal induced by touching the surface of the touch screen 500. If the scan frequency component is detected, the controlled device 504 creates information regarding the detected scan frequency component and identification (ID) information of the controlled device 504 and transmits the information to the control device through the communication channel. The control device may select the controlled device 504 based on the received information.

Referring back to FIG. 4, in operation 404, the control device transmits an image representing the selected controlled device to the external device. The image may be prestored in the control device or may be received from the selected controlled device. The control device may transmit the image representing the controlled device, of which predetermined portions are mapped to commands for controlling the controlled device, to the external device. Also, the control device may transmit commands for controlling the controlled device together with the image representing the controlled device to the external device. According to another exemplary embodiment of the present invention, the control device may transmit ID information of the selected controlled device, such as a model name, to an external server that is commonly connected to the external device and the control device. Then, the external server transmits a model image corresponding to the model name to the external device.

In operation 405, the control device receives a control command to control the controlled device from the external device, which is created based on an external input using the image representing the controlled device. Then, the control device transmits the control command to the controlled device.

In operation 406, the control device receives a current user interface image of the controlled device shared by the control device from the controlled device. Alternatively, the control device may directly create a current user interface image of the controlled device. Then, the control device transmits the user interface image to the external device. The control device may transmit the user interface image of which predetermined portions are mapped to commands for controlling the controlled device. Alternatively, the control device may transmit commands for controlling the controlled device together with the user interface image to the external device In operation 407, the control device receives from the external device a control command to control the controlled device, which is created by the external device based on an external input using the user interface image. Then, the control device transmits the control command to the controlled device. If an interface screen of the controlled device is changed, the method may return to operation 405.

Figure 6:
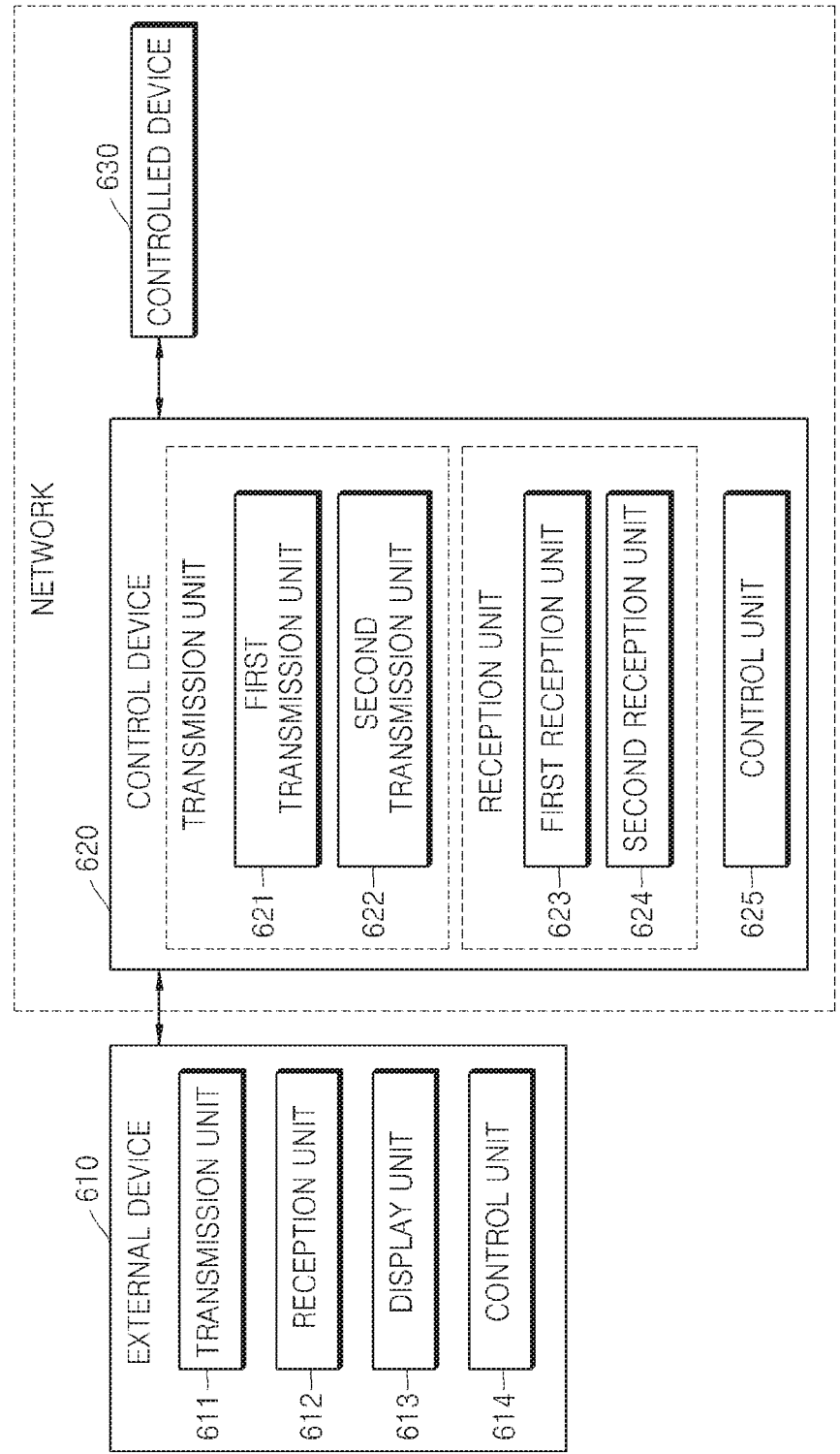
FIG. 6 is a block diagram of a system for controlling at least one controlled device from outside a network including a control device and the controlled device, according to an exemplary embodiment of the present invention.

FIG. 6 is a block diagram of a system for controlling at least one controlled device 630 from outside a network including a control device 620 and the controlled device 630, according to an exemplary embodiment of the present invention.

Referring to FIG. 6, the system includes an external device 610, the control device 620, and the controlled device 630. Also, the external device 610 includes a transmission unit 611, a reception unit 612, a display unit 613, and a control unit 614, and the control device 620 includes a transmission unit including first and second transmission units 621 and 622, a reception unit including first and second reception units 623 and 624, and a control unit 625. The control device 620 and the controlled device 630 are connected to each other in the network. The control device 620 means a device that may communicate with the external device 610 at a remote location and that may control the controlled device 630 in the network.

The transmission unit 611 of the external device 610 transmits a message accepting a control request requesting to control the controlled device 630 to the control device 620 with which a session is established, the control request being received from the control device 620. The control request is created by the control device 620 in order to authorize the external device 610 to control the controlled device 630.

The reception unit 612 of the external device 610 receives an identifier for identifying the controlled device 630 from the control device 620. The identifier may be an image representing the controlled device 630.

The display unit 613 of the external device 610 displays the received image representing the controlled device 630. The display unit 613 of the external device 610 may be a touch screen.

If the reception unit 612 of the external device 610 receives commands for controlling the controlled device 630 which correspond to predetermined portions of the image representing the controlled device 630, the control unit 614 of the external device 610 may map the commands to the predetermined portions of the image representing the controlled device. Alternatively, the reception unit 612 of the external device 610 may receive the image to which commands for controlling the controlled device 630 are mapped. If a user input regarding the controlled device 630 is made using the displayed image representing the controlled device 630, the control unit 614 of the external device 610 transmits a predetermined control command to control the controlled device 630 to the control device 620. According to another exemplary embodiment of the present invention, the control unit 614 of the external device 610 may transmit the control command to control the controlled device 630 directly to the controlled device 630.

As the controlled device 630 executes the control command, if a user interface of the controlled device 630 is changed, the reception unit 612 of the external device 610 receives a user interface image of the controlled device 630 from the control device 620. Alternatively, the reception unit 612 of the external device 610 may receive the user interface image directly from the controlled device 630. The display unit 613 of the external device 610 displays the user interface image. If the reception unit 612 of the external device 610 receives commands for controlling the controlled device 630 which correspond to predetermined portions of the user interface image, the control unit 614 of the external device 610 may map the commands to the predetermined portions of the user interface image. Alternatively, the reception unit 612 of the external device 610 may receive the user interface image to which commands for controlling the controlled device 630 are mapped. If a user input regarding the controlled device 630 is made using the displayed user interface image, the control unit 614 of the external device 610 transmits a predetermined control command to control the controlled device 630 to the control device 620. According to another exemplary embodiment of the present invention, the control unit 614 of the external device 610 may transmit the control command to control the controlled device 630 directly to the controlled device 630.

According to another exemplary embodiment of the present invention, as the controlled device 630 is controlled by the control command, if the user interface of the controlled device 630 is changed, the reception unit 612 of the external device 610 receives a control command menu for the controlled device 630 to perform a predetermined function. In this case, the display unit 613 of the external device 610 displays the control command menu. Then, if a user input regarding the control command menu is made, the control unit 614 of the external device 610 transmits a control command corresponding to the user input to the control device 620 via the transmission unit 611 of the external device 610.

The control device 620 creates a control request in order to authorize the external device 610 to control the controlled device 630. Then, the first transmission unit 621 of the control device 620 transmits the control request requesting to control the controlled device 630 to the external device 610 with which a session is established. Then, the first reception unit 623 of the control device 620 receives from the external device 610 a message accepting the control request.

The second transmission unit 622 of the control device 620 transmits the image representing the controlled device 630 to the external device 610. The image may be prestored in the control device 620 or may be received from the controlled device 630. According to another exemplary embodiment of the present invention, the second transmission unit 622 of the control device 620 may transmit ID information of the controlled device 630, such as a model name, to an external server that is commonly connected to the external device 610 and the control device 620. Then, the external server transmits a model image corresponding to the model name to the external device 610.

The second reception unit 624 of the control device 620 receives the control command to control the controlled device 630, which is created by the external device 610 based on an external input using the image representing the controlled device 630. Then, the second transmission unit 622 of the control device 620 transmits the control command to the controlled device 630. Also, as the controlled device 630 executes the control command, if the user interface of the controlled device 630 is changed, the second reception unit 624 of the control device 620 receives from the controlled device 630 a current user interface image of the controlled device 630 shared by the control device 620. Alternatively, the control device 620 may directly create a current user interface image of the controlled device 630.

The second transmission unit 622 of the control device 620 transmits the user interface image to the external device 610.

The second reception unit 624 of the control device 620 receives the control command to control the controlled device 630, which is created by the external device 610 based on an external input using the user interface image. Then, the control command is transmitted to the controlled device 630 via the second transmission unit 622 of the control device 620.

The control unit 625 of the control device 620 searches for and selects the controlled device 630 shared by the control device 620. If the controlled device 630 includes a tag having the ID information of the controlled device 630, the control unit 625 of the control device 620 identifies and selects the controlled device 630 by using a tag reader for reading the tag. According to another exemplary embodiment of the present invention, the control unit 625 of the control device 620 transmits to the controlled device 630 a signal induced by the user touching the surface of the touch screen, receives information regarding a signal detected by the controlled device 630 and an ID of the controlled device 630 through a communication channel, and determines the controlled device 630 based on the received information regarding the signal and the ID of the controlled device 630. The control unit 625 of the control device 620 may map the commands for controlling the controlled device 630 to the predetermined portions of the image representing the controlled device 630 and may transmit the image representing the controlled device 630 to the external device 610 via the second transmission unit 622. The control unit 625 of the control device 620 may map the commands for controlling the controlled device 630 to the predetermined portions of the user interface image and may transmit the user interface image to the external device 610 via the second transmission unit 622. According to another exemplary embodiment of the present invention, as the controlled device 630 is controlled by a control command, if the user interface of the controlled device 630 is changed, the control unit 625 of the control device 620 creates the control command menu for the controlled device 630 to perform a predetermined function, and transmits the control command menu to the external device 610 via the second transmission unit 622. Then, the second reception unit 624 of the control device 620 receives the control command to control the controlled device 630 using the control command-based menu and the second transmission unit 622 may transmit the control command to the controlled device 630.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of controlling at least one controlled device, the method comprising:
   receiving, at a second control device, a request message from a first control device, the request message requesting to control a controlled device of the at least one controlled device;
   transmitting, by the second control device, an acceptance message for accepting the received request message to the first control device;
   identifying, by the second control device, a selected controlled device that is selected from among a plurality of controlled devices by the first control device based on a scan frequency component of an induced signal received by the controlled device from the first control device, the induced signal being induced by a user touching a touch screen of the first control device;
   receiving, at the second control device, information to control the selected controlled device from the first control device, the information including a model image representing the selected controlled device and control information for controlling the selected controlled device;
   displaying, the model image and the control information corresponding to the selected controlled device on the second control device, the control information being displayed on a location associated with the model image; and
   controlling, by the second control device, the selected controlled device based on the control information,
   wherein the control information is updated based on a graphical user interface being currently displayed on a screen of the selected controlled device.

2. The method of claim 1, wherein the control information comprises at least one image to which at least one control command for controlling the selected controlled device is mapped.

3. The method of claim 2, wherein the displaying the model image and the control information comprises:
   receiving a user input to select the model image; and
   displaying the at least one image to which the at least one control command is mapped, in response to receiving the user input.

4. The method of claim 2, wherein the at least one image to which the at least one control command is mapped forms a control menu for controlling the selected controlled device.

5. The method of claim 4, wherein the control menu corresponds to a control command menu being currently displayed on a screen of the selected controlled device.

6. The method of claim 1, the method further comprising receiving the information to control the selected controlled device from an external server connected to the first control device.

7. A control device comprising:
   a display;
   a memory which is configured to store at least one program; and
   at least one processor which is configured to execute the at least one program,
   wherein the at least one program comprises commands for:
      receiving a request message for requesting to control a controlled device from another control device;
      transmitting an acceptance message for accepting the received request message to the other control device;
      identifying the controlled device as a selected controlled device that is selected by the other control device from among a plurality of controlled devices based on a scan frequency component of an induced signal received by the controlled device from the other control device, the induced signal being induced by a user touching a touch screen of the other control device;
      receiving information to control the selected controlled device from the other control device, the information comprising identification information indicating a model image representing the selected controlled device and control information for controlling the selected controlled device;
   displaying, the model image and the control information corresponding to the selected controlled device on the second control device, the control information being displayed on a location associated with the model image; and
   controlling, by the second control device, the selected controlled device based on the control information,
   wherein the control information is updated based on a graphical user interface being currently displayed on a screen of the selected controlled device.

8. The control device of claim 7, wherein the control information includes at least one image to which at least one control command for controlling the selected controlled device is mapped.

9. The control device of claim 8, wherein the at least one program further comprises commands for:
   receiving a user input to select the model image; and
   displaying the at least one image to which the at least one control command is mapped, in response to receiving the user input.

10. The control device of claim 8, wherein the at least one image to which the at least one control command is mapped forms a control menu for controlling the selected controlled device.

11. The control device of claim 10, wherein the control menu corresponds to a control command menu being currently displayed on a screen of the selected controlled device.

12. The control device of claim 7, wherein the at least one program further comprises commands for receiving the information to control the selected controlled device from an external server connected to the other control device.

13. The control device of claim 7, wherein the selected controlled device generates information indicating the scan frequency component of the induced signal and the identification indicating the selected controlled device based on the scan frequency component being detected.

14. The control device of claim 7, wherein the induced signal is induced by a user that is touching the other control device while the controlled device is held by the user.

15. At least one non-transitory computer-readable recording medium for storing a computer program configured to be readable by at least one processor for instructing the at least one processor to execute a computer process for performing a method of controlling at least one controlled device, the method comprising:
- receiving, at a second control device, a request message from a first control device, the request message requesting to control a controlled device of the at least one controlled device;
- transmitting, by the second control device, an acceptance message for accepting the received request message to the first control device;
- identifying, by the second control device, a selected controlled device that is selected from among a plurality of controlled devices by the first control device based on a scan frequency component of an induced signal received by the controlled device from the first control device, the induced signal being induced by a user touching a touch screen of the first control device;
- receiving, at the second control device, information to control the selected controlled device from the first control device, the information including a model image representing the selected controlled device and control information for controlling the selected controlled device;
- displaying, the model image and the control information corresponding to the selected controlled device on the second control device, the control information being displayed on a location associated with the model image; and
- controlling, by the second control device, the selected controlled device based on the control information,
- wherein the control information is updated based on a graphical user interface being currently displayed on a screen of the selected controlled device.

* * * * *